Jan. 9, 1951        A. B. PUTNAM        2,537,702

PAVEMENT FRACTURING MACHINE

Filed Oct. 14, 1947        2 Sheets-Sheet 1

INVENTOR:
Ayers B. Putnam
BY
Milo B. Stevens & Co.
Attorneys.

Jan. 9, 1951 A. B. PUTNAM 2,537,702
PAVEMENT FRACTURING MACHINE
Filed Oct. 14, 1947 2 Sheets-Sheet 2
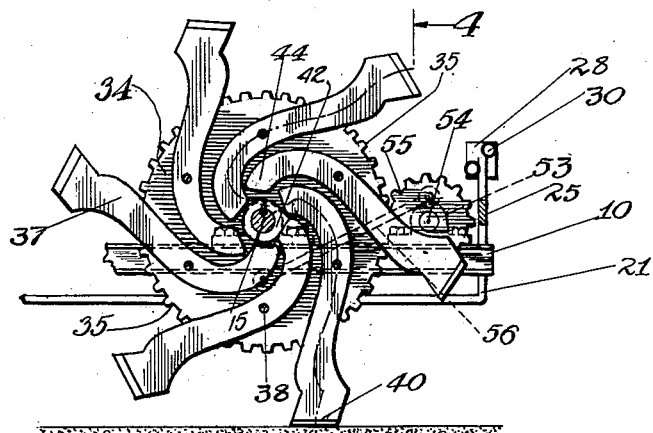
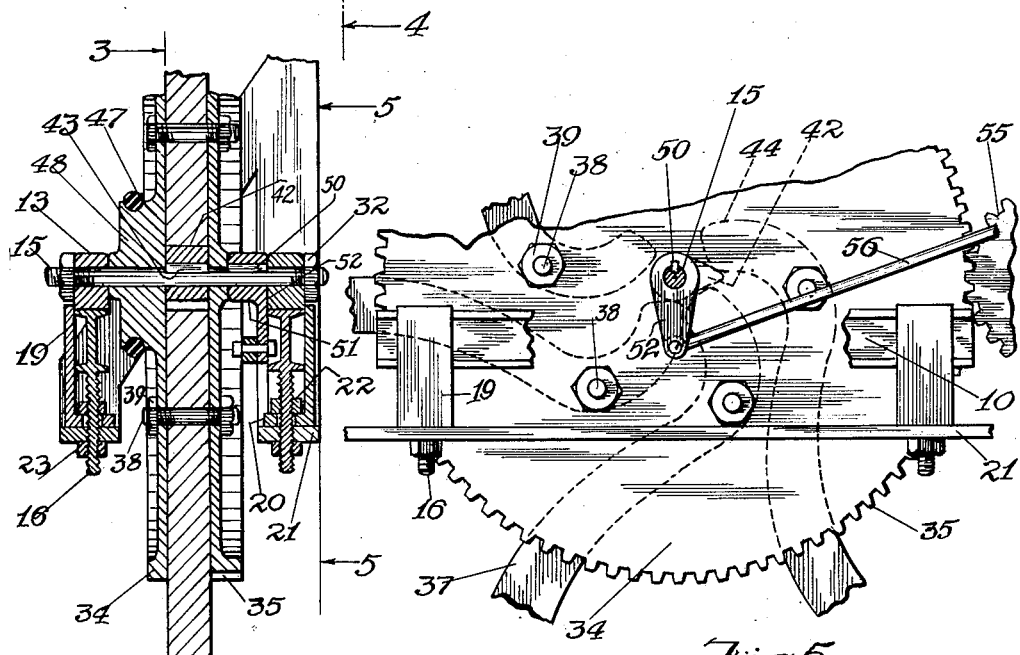
INVENTOR:
Ayers B. Putnam
BY
Milo B. Stevens & Co.
Attorneys.

Patented Jan. 9, 1951

2,537,702

UNITED STATES PATENT OFFICE 2,537,702

PAVEMENT FRACTURING MACHINE

Ayers B. Putnam, Chicago, Ill.

Application October 14, 1947, Serial No. 779,705

4 Claims. (Cl. 262—14)

My invention relates to implements for fracturing pavements, and is designed as an improvement over the pick-axes or pneumatic chisels now in use for that purpose.

It is one object of the invention to change an implement of the above character from a hand-operated or supported one to a rotary hammer or breaker which is carried by a vehicle and receives power therefrom to inflict fracturing blows on the pavement in rapid succession.

A further object is to design the novel rotary hammer or breaker with a circularly-grouped series of arms formed with chisel ends, and to revolve these arms with impulses driving the said ends against the pavement with considerable force.

Another object is to construct the novel rotary hammer or breaker as an attachment for a tractor or similar vehicle, the drive for the machine being secured from the power take-off of the tractor.

An additional object is to design the novel machine in a manner to make possible the employment of fracturing units in gang or series formation and gain a relatively large area of application.

A further object is to construct the novel machine along lines of simplicity and durability.

With the above objects in view, and any others which may suggest themselves from the description to follow, a better understanding of the invention may be had by reference to the accompanying drawings; in which—

Fig. 3 is a view in side elevation showing the rotary hammer or breaker alone, or removed from the tractor, as seen from the section line 3—3 of Fig. 4;

Fig. 4 is a sectional view taken on lines 4—4 of Fig. 3 showing the rotary hammer or breaker alone, in vertical section on an enlarged scale; and Fig. 5 is a section on the line 5—5 of Fig. 4.

Figure 1:
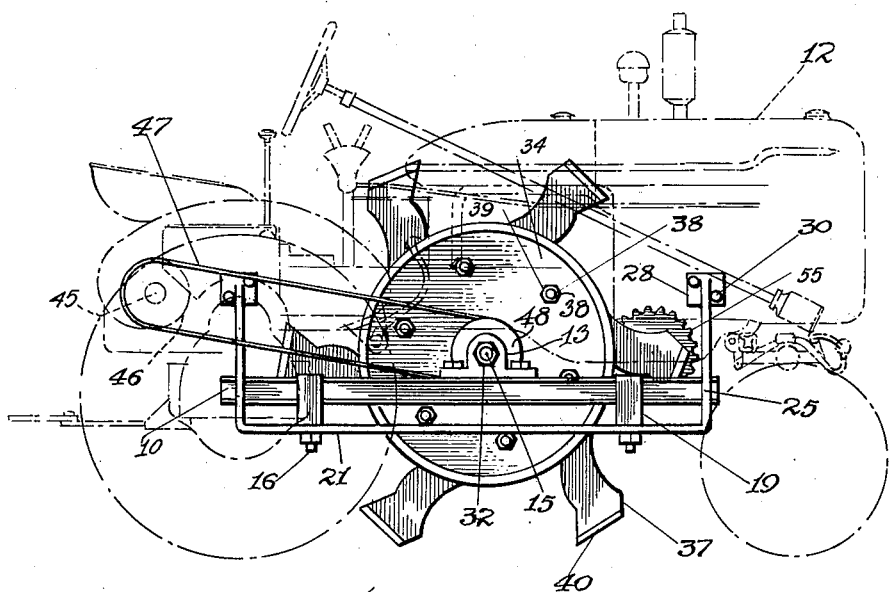
Fig. 1 is a side elevation of the rotary hammer or breaker as mounted on a tractor.
Figure 2:
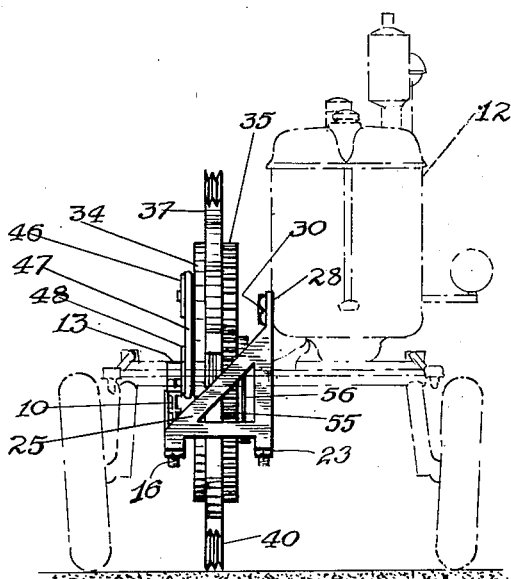
Fig. 2 is a view in front elevation of the rotary hammer or breaker mounted on the side of a tractor.

In accordance with the foregoing, the rotary hammer may be considered primarily as a unit mounted between a pair of I-beams 10 extending along one side of the tractor or other vehicle 12 which is designed to carry the machine. The beams 10 support bearings 13 which journal the main shaft 15 of the rotary hammer.

The beams 10 are formed with longitudinally-spaced pendent screws 16 which occur inwardly of guards 19 having base flanges 20 seating on longitudinal frame bars 21; and the screws pass freely through the flanges, receiving nuts 22 above the flanges and nuts 23 below the bars. The latter have rising end frames 25 which terminate with plates 28, these being bolted to the sides of the tractor as indicated at 30. When the height and leveling of the main shaft 15 have been determined, the nuts 22 and 23 are tightened, so that the main shaft becomes adjustably supported from the tractor in this manner. While the rotary hammer may be considered properly attached to or supported from the tractor by the means just described, other means may be designed to serve the purpose if they are more readily adaptable, convenient or economical.

The main shaft 15 is locked against end motion by being threaded outside the bearings 13 to receive securing nuts 32. Between the bearings the shaft receives a spaced pair of flywheels 34, these being freely rotatable on the main shaft and the inner one having a spur-gear periphery 35. The flywheels receive between them a spiral arrangement of levers 37 pivoted at intermediate points on cross-bolts 38 passing through the flywheels 34, the cross-bolts receiving securing nuts 39 outside the flywheels. The secured spacing of the flywheels is such as to permit the free pivotal motion of the levers 37.

The outer ends of the levers 37 are fitted with removable or interchangeable hardened shoes 40 extended with one or more chisel points. A twin point shoe is shown in Fig. 4. Thus, when a lever has been carried by the flywheels 34—when these are rotated in a clockwise direction—to the position indicated in the bottom portion of Fig. 3, it is the purpose of the machine to impose a quick clockwise turn to the lever, so that its shoe strikes the ground with force.

The element designed to motivate, that is, to trip the levers as just mentioned comprises a cam 42 keyed on the main shaft 15 as indicated at 43. One position of the cam is lateral, as shown in Fig. 5, but the cam is designed to be oscillated, whereby to act periodically as a lifter for the heel 44 of each lever 37 descending on the right. With the levers revolving at a rapid rate, it will be apparent that the effect of the rising cam impulses thereon will be to trip the levers in quick succession. Where the ground is in the form of a pavement which must be broken up, the operation of the levers will deliver a continual succession of sharp chisel blows effective to fracture the pavement along the course over which the revolving levers travel. Also, the levers may be staggered from each other at their outer ends, and also variously pointed, to cover a wide course of application.

The flywheels 34 receive their motion from the power take-off shaft 45 of the tractor. Such shaft carries a pulley 46 from which a belt drive 47 is transmitted to a pulley 48 extended from the outer flywheel. The operation of the cam 42 is induced by the flywheels. Thus, the main shaft 15 also has keyed on it at 50 a hub 51 extended with a radius arm 52. One of the beams 10 receives a bearing 53 for a shaft 54 which carries a spur pinion 55. The latter is in mesh with the teeth 35 of one of the flywheels; and a pitman 56 extends from the pinion 55 to the outer end of the radius arm 52. Thus, the relatively high-speed rotation of the pinion induces the rapid oscillation of the cam 42 with the result mentioned.

It will be apparent that a rotary hammer constructed as described forms a compact unit which is readily attachable to the side of a tractor or other utility vehicle to facilitate the rapid fracture of a chosen course of pavement. Being power operated, the machine may be designed to exert as much striking force or as rapid a delivery of fracturing blows as may be needed. Further, the pivoting of the striking levers is in the manner of hammers, and the tripping thereof sudden, whereby to impart sharp blows. Further, the revolution of the levers renders them applicable in rapid succession, making their blows effective and the fracturing process efficient and rapid. Finally, the rotary hammer is an assembly of few and simple parts and fully automatic in operation.

While I have described the invention along specific lines, various minor changes or refinements may be made therein without departing from its principle, and I reserve the right to employ such changes and refinements as may come within the scope and spirit of the appended claims.

I claim:

1. A pavement fracturing machine comprising a support, a series of rotary elements operative to inflict a succession of blows on the pavement, and power means to revolve the elements in relation to the support, said rotary elements being a circularly-arranged series of levers, and said power means comprising flywheels, means pivoting the levers to the flywheels at intermediate points, one of the ends of the levers being outwardly located and designed to inflict said blows, and oscillating cam means in the central region of the flywheels designed to trip the other ends of the levers and swing them in a direction to inflict said blows.

2. A pavement fracturing machine comprising a support, a series of rotary elements operative to inflict a succession of blows on the pavement, and power means to revolve the elements in relation to the support, said support comprising a shaft, said power means being flywheels freely rotatable on the shaft, and said rotary elements being a circularly-arranged series of levers, means pivoting the latter to the flywheels at intermediate points, one of the ends of the levers being outwardly located and designed to inflict said blows, an oscillating cam carried by said shaft and designed to trip the other ends of the levers and swing them in a direction to inflict said blows, and a drive from the flywheels to operate said cam.

3. A pavement fracturing machine comprising a support, a series of rotary elements operative to inflict a succession of blows on the pavement, and power means to revolve the elements in relation to the support, said support comprising a shaft, said power means being flywheels freely rotatable on the shaft, and said rotary elements being a circularly-arranged series of levers, means pivoting the latter to the flywheels at intermediate points, one of the ends of the levers being outwardly located and designed to inflict said blows, an oscillating cam carried by said shaft and designed to trip the other ends of the levers and swing them in a direction to inflict said blows, one flywheel having a peripheral gear formation, a pinion meshed with the latter to secure a drive at multiplied speed, a radius arm control for the cam, and a pitman from the pinion to the radius arm to induce the oscillation of the cam when the flywheels are in rotation.

4. A pavement fracturing machine comprising a support, a series of rotary elements operative to inflict a succession of blows on the pavement, and power means to revolve the elements in relation to the support, said rotary elements being a circularly-arranged series of levers, and said power means comprising flywheels, means pivoting the levers to the flywheels at intermediate points, one of the ends of the levers being outwardly located and designed to inflict said blows, and rockable cam means in the central region of the flywheels designed to trip the other ends of the levers and swing them in a direction to inflict said blows.

AYERS B. PUTNAM.

REFERENCES CITED

The following references are of record in the file of this patent:

UNITED STATES PATENTS

| Number | Name | Date |
|---|---|---|
| 1,092,632 | Crain | Apr. 7, 1914 |
| 1,300,595 | Fonnesbeck | Apr. 15, 1919 |
| 1,518,505 | Gray | Dec. 9, 1924 |
| 2,009,500 | Kramer | July 30, 1935 |